INVENTOR
JOSE MARLET BARRERA

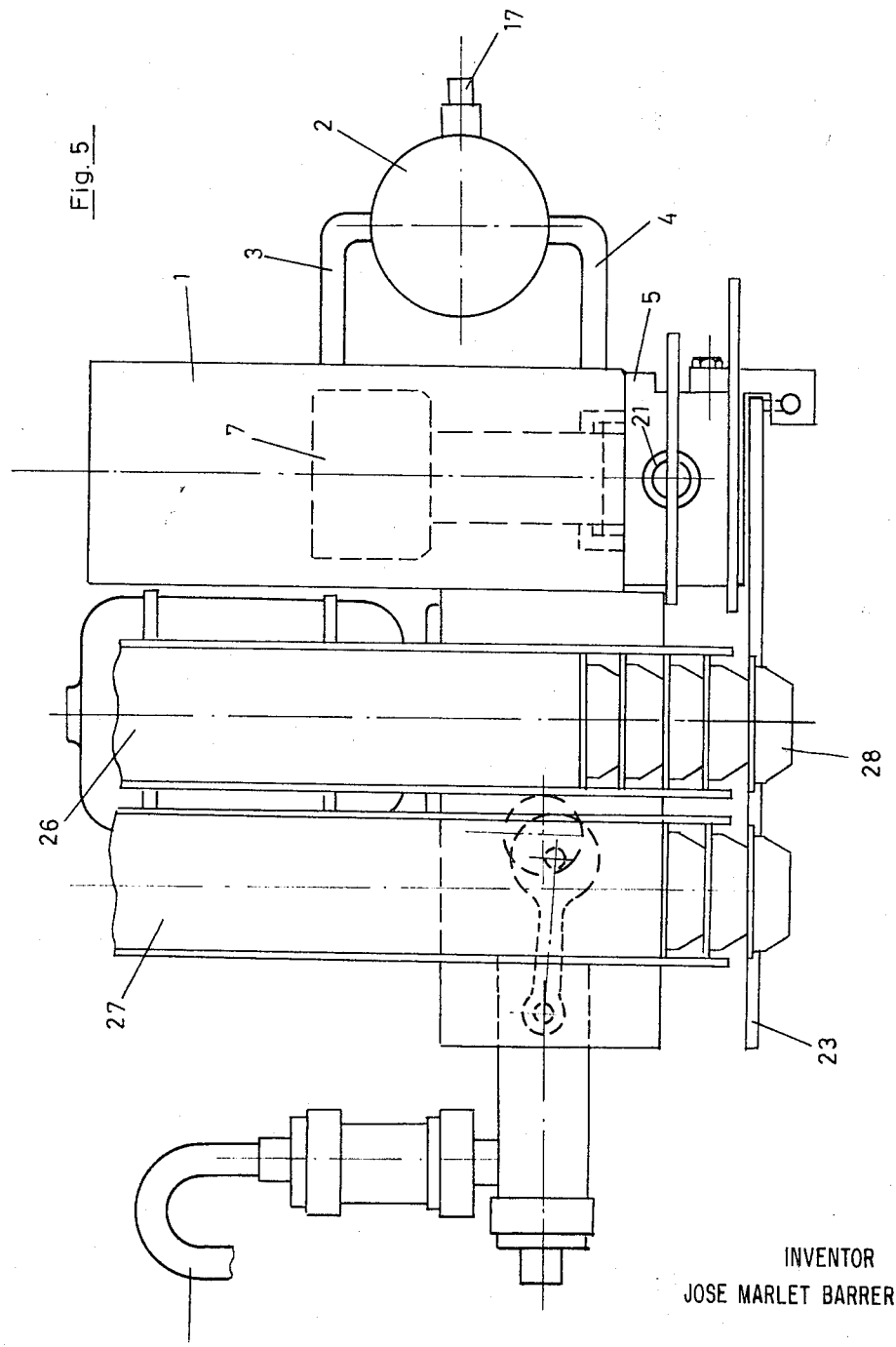

BY *Irvine & Smiley*

ATTORNEYS

INVENTOR
JOSE MARLET BARRERA

United States Patent Office 3,440,951
Patented Apr. 29, 1969

3,440,951
AUTOMATIC COFFEE BREWING MACHINE
Jose Marlet Barrera, Paseo Valldoreix 6, San Cugat del Valles, Barcelona, Spain
Filed Oct. 27, 1967, Ser. No. 678,652
Claims priority, application Belgium, Oct. 27, 1966, 688,979
Int. Cl. A47j 31/40
U.S. Cl. 99—282
9 Claims

ABSTRACT OF THE DISCLOSURE

An automatic coffee brewing machine utilizing prepackaged coffee containers for individual brews. Cycled valve mechanisms admit hot water under pressure to be forcefully passed through the individual containers, the containers being indexed to such position and held in sealed relation with the passage conducting the hot water.

Background of the invention

Automatic coffee brewing machines conventionally employ a basket device for containing the ground coffee during the brewing cycle. The supply of coffee may be either in bean form in which case it is ground prior to each brewing operation or the supply may be in the form of ground coffee in which case a measured supply is metered to the basket for each brewing cycle directly from the main supply. During the brewing cycle, a measured amount of hot water is passed through the basket containing the ground coffee and thereafter the basket is automatically removed and dumped and cleaned. All of this requires a substantial amount of mechanism and also also possesses the disadvantage that complete cleaning of the basket is at best difficult so that accumulations of foreign material will pile up on the basket to detrimentally affect the taste of subsequently brewed coffee and also in such position as to interfere with the proper sealing of the basket. This latter effect causes the infusing hot water to leak past the basket containing the ground coffee so that a proper brewing or infusing action is not achieved.

Summary of the invention

The present invention is directed to an automatic coffee brewing machine which employs individually packaged containers each of which contains an amount of ground coffee sufficient to produce one cup. The container with this spent coffee is thereafter discharged so that each time during a brewing cycle a new container perfectly clean is positioned for use. This arrangement also allows the mechanism of the brewing machine to be simplified greatly, obviating the necessity for cumbersome and complex arrangement of component parts, concomitantly to increase materially the reliability of the machine.

Brief description of drawings

The above and other objects of the invention will be understood better by a reference to the accompanying drawings in which:

FIG. 4 is an enlarged elevational section showing the manner in which the individual containers are caused to effect a seal during the brewing process;

FIG. 5 is a side elevational view of the machine illustrating the disposition of the containers;

Detailed description of invention

Figure 1:
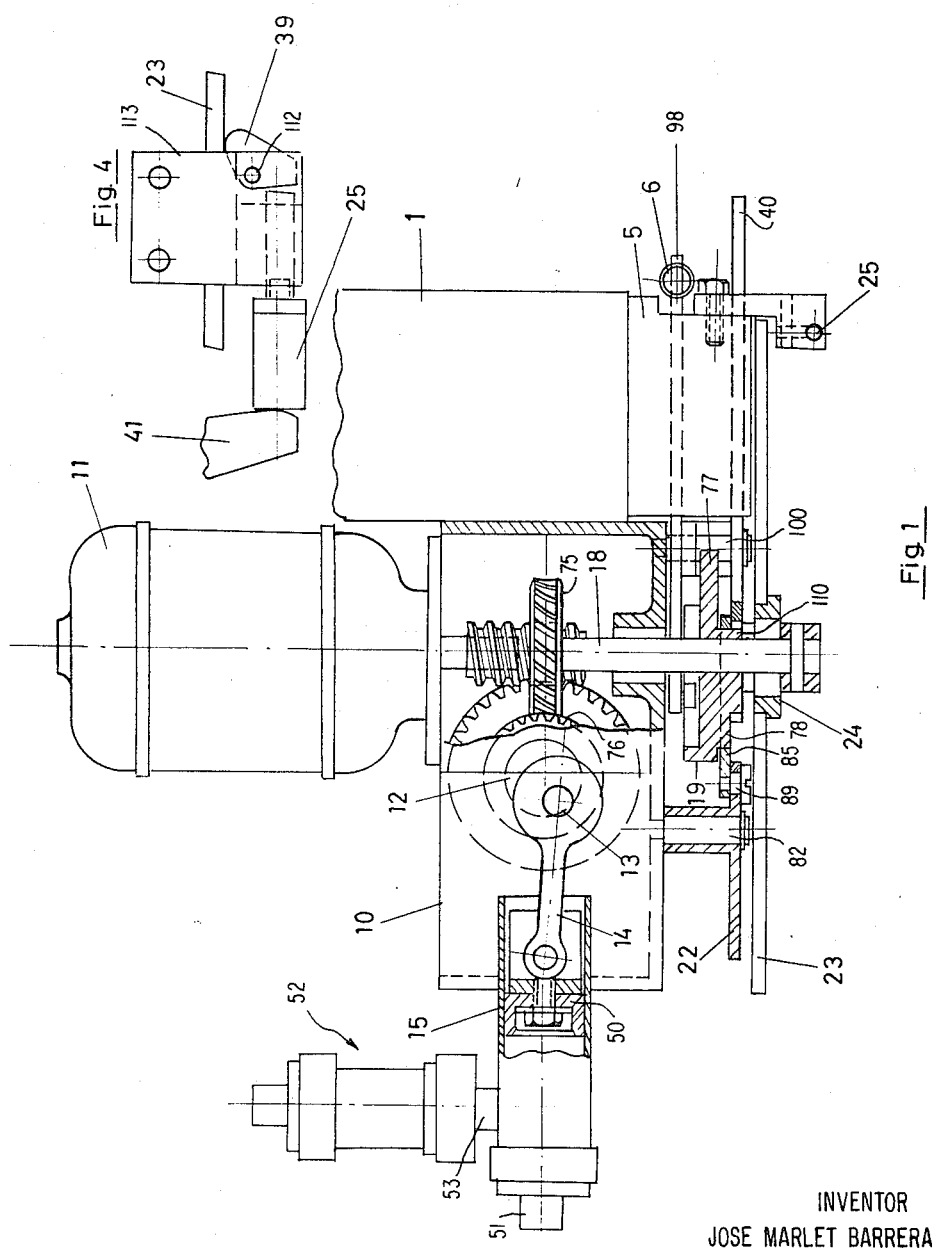
FIG. 1 is an elevational view, partly in section, showing a brewing machine constructed according to the present invention.
Figure 9:
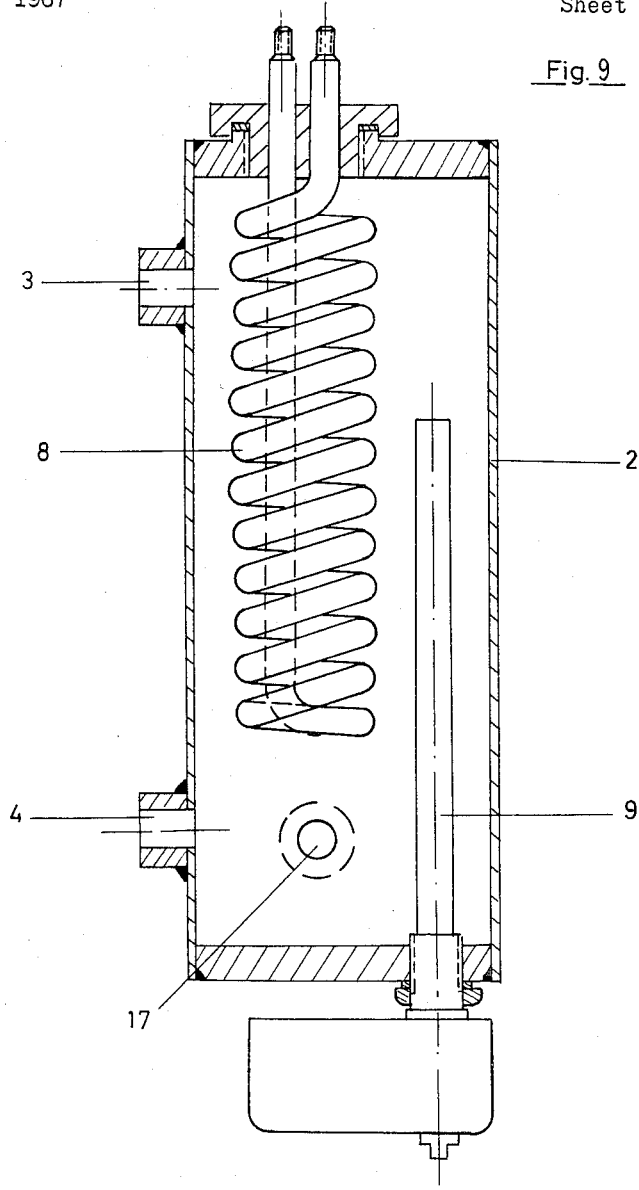
FIG. 9 is an enlarged horizontal section taken through the water heating mechanism.

Referring at this time more particularly to FIGS. 1 and 5, the reference numeral 1 therein indicates a hot water reservoir whereas the reference numeral 2 indicates a water heater shown more particularly in detail in FIG. 9. As shown in FIG. 9, the heater 2 is in the form of a cylindrical body having an inlet nipple 4 for connection to the reservoir 1 and an outlet nipple 3 connected to the reservoir 1 in vertical disposition above the inlet. This arrangement of connection between the heater 2 and the reservoir 1 allows thermal conduction to retain the water in the reservoir 1 at a reasonably constant temperature. Within the heater 2 is provided an electrical heating coil 8 and an associated thermostat 9 for controlling the heating coil so as to maintain requisite temperature of water within the heater 2 and consequently within the reservoir 1.

The heater 2 is also provided with an additional inlet at 17 wherein fresh water is introduced during each brewing cycle. Thus, the reservoir 1 is maintained full at all times. The reservoir 1 contains a pressure accumulator device 7 which is closed insofar as the interior of the container 1 is concerned but which is associated with valve means hereinafter described which allows the fresh water injected into the heater at 17 to be displaced and accumulate within the accumulator 7 and thereafter to be expelled from the accumulator through the coffee container. Thus, the volume of the accumulator 7 is responsible for dispensing a predetermined quantity of infusing hot water through the container having ground coffee therein properly to brew the requisite amount of coffee.

For the above described purposes, the accumulator 7 may simply be in the form of a cylinder containing a piston normally spring biased to expell water therefrom. Upon the forcible introduction of water into the system, the piston is displaced against the action of its spring biasing means to accommodate and accumulate within the cylinder a measured amount of water which will be dependent upon the pressure of the fresh water injected at 17 into the heater 2.

Figure 6:
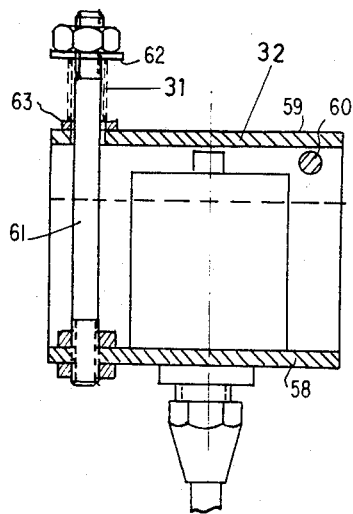
FIG. 6 is an enlarged vertical section taken through the pressurizing valve assembly.
Figure 7:
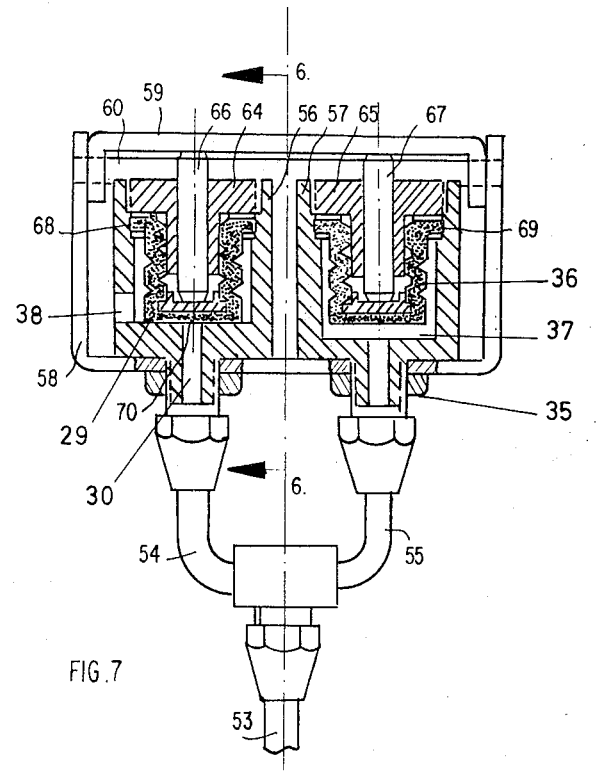
FIG. 7 is a view similar to FIG. 6 but taken at right angles thereto.
Figure 8:
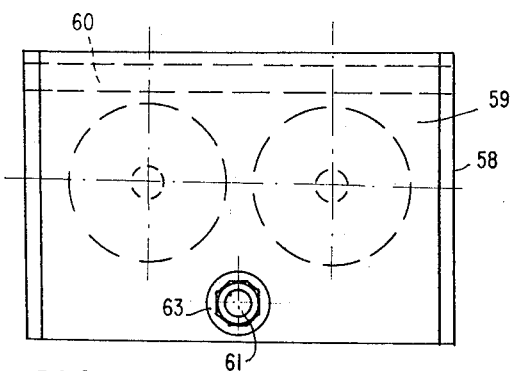
FIG. 8 is a plan view of the assembly shown in FIGS. 6 and 7.

The fresh water injecting mechanism can be seen more clearly in FIG. 1. The fresh water injector includes a cylinder 15 and an associated piston 50, the interior of the cylinder 15 being connected to a fresh water supply at 51 and there being an associated check valve (not shown) to prevent water from being displaced back into the supply line. A pressure regulating assembly indicated generally by the reference character 52 is adapted to control the pressure of water expelled from the cylinder 15 during a brewing cycle and for this purpose, the outlet 53 from the cylinder 15 is branched as at 54 and 55 as shown in FIG. 7 to distribute the water to the two valve blocks 56 and 57. The valve blocks are mounted on a common support member 58 having a lever member 59 hinged thereto as by the pintle pin 60. A reaction rod 61 (FIG. 6) is anchored at its lower end on the support 58 and projects vertically therefrom to pass through a suitably enlarged opening in the lever 59 to allow free movement of the latter about the axes of the pintle 60 and a compression spring member 31 is interposed between the collar 62 carried by the rod 61 and the collar 63 on the lever 59.

Each of the valve blocks 56 and 57 is provided with a bushing member 64, 65 within which the plungers 66 and 67 are slidably received, the upper ends of these plungers bearing against the under side of the lever 59 and acting, as hereinafter described, to oppose the spring 31. Resilient cups 29 and 36 are anchored at their upper flanged portions 68 and 69 by the members 64 and 65 respectively to effect a seal with the valve blocks and the lower face 70 of the cup 29 is adapted to seat against the interior of the valve block 56 normally to close the passage 30 which communicates with the branch 54. The other cup 36 does not seat against its associated valve block 57 and thus with the parts in the position shown in FIG. 7, the full end area of the cup 36 is exposed to incoming fluid pressure. Thus, the plunger 67 operates to oppose the spring 31 and upon attainment of a predetermined pressure from the injecting means, the lever 59 will be pivoted sufficiently to unseat the cup 29 and allow the injection water to flow through the branch 54, passage 30 and out through the outlet 38 whence it is directed through the conduit 16 (FIG. 5) which leads to the inlet 17 of the heater 2.

The piston 50 is operated through the medium of a connecting rod 14 journaled on the crank pin 13 of the crank pivot 12 as shown in FIG. 1. The crank pivot is rotated by means of the motor 11 which rotates the pivot 18. The worm gear set 75, 76 effects rotation of the crank shaft 12 in response to the rotation of the driven shaft 18.

The driven shaft 18 projects downwardly through the housing 10 and has rigidly affixed thereto a cam plate 77. This cam plate includes an eccentric portion 78 and an interrupted flange type cam 19.

Figure 2:
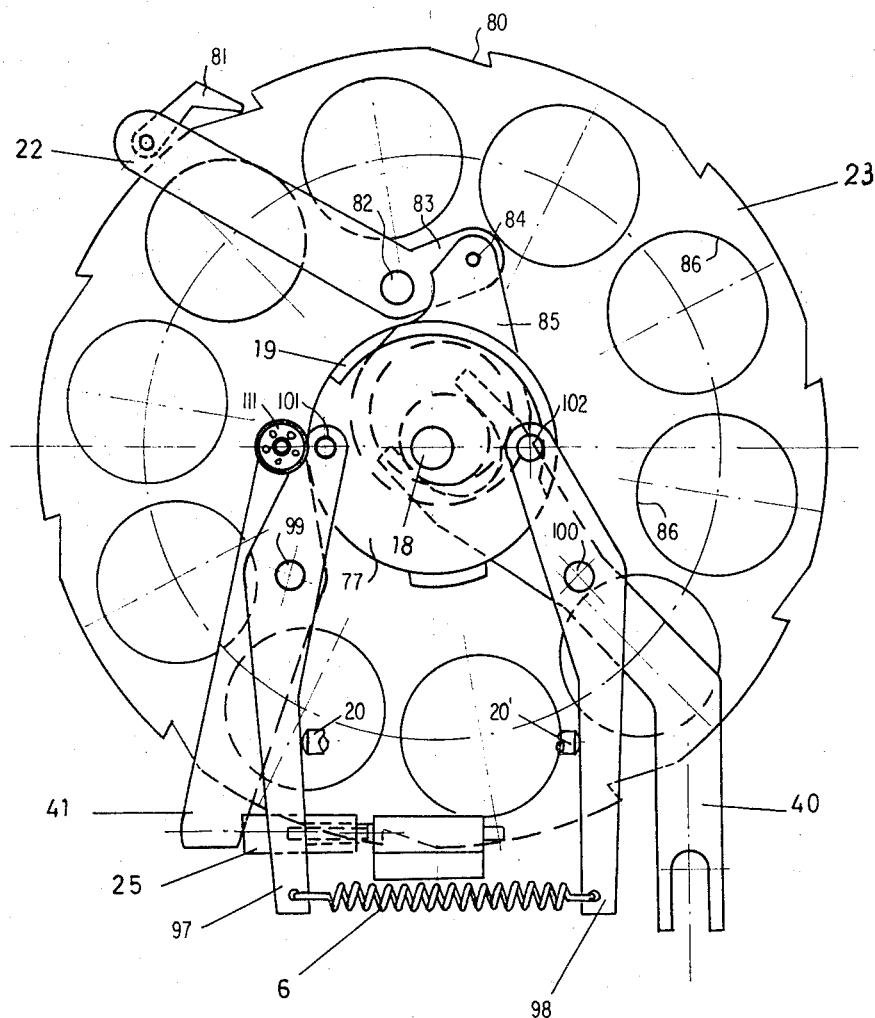
FIG. 2 is a horizontal section showing the container transporting table in plan view and also illustrating certain mechanisms associated with the valving arrangement.

The main frame of the machine, not shown, carries a bushing element 24 concentrically disposed with respect to the shaft 18 and journaled on this bushing is the transporting plate 23 which, as shown in FIG. 2, is peripherally notched as at 80 for the reception of a pawl device 81 carried by the actuating lever 22. The lever 22 is journaled on a stub shaft 82 (FIG. 1) and has an arm portion 83 pivotally connected as at 84 to the ring member 85 which is journaled upon the eccentric portion 78 of the element 77 driven by the shaft 18. Thus, rotation of the shaft 18 will advance the table 23. The table 23 is provided with a series of pocket openings 86 which are sequentially passed beneath container tubes 26 and 27 whereby the empty pockets 86 receive the individual containers 28, see particularly FIG. 5.

Figure 3:
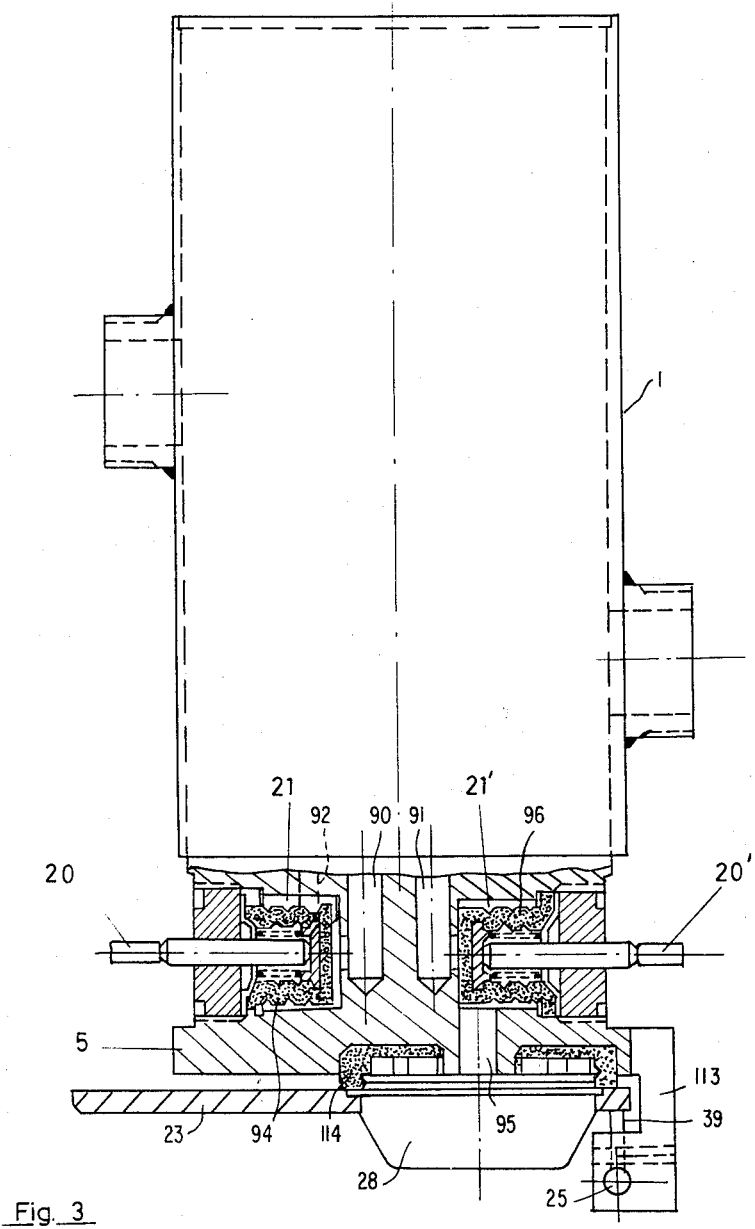
FIG. 3 is an enlarged elevational view, partly in section, showing the valve arrangement for the control of the infusing water and also illustrating the disposition of one of the containers in association therewith.

As shown in FIG. 3, the accumulator device 7 is provided with an inlet passage 90 and an outlet passage 91. The inlet passage 90 communicates with the interior of the reservoir 1 through the passage 92 which leads to the chamber 21 of the valve member 94 whereas the outlet passage 91 communicates with the infusing water discharge spout 95 through the chamber 21' of valve 96. The two valves are separated by the plungers 20 and 20' respectively. These plungers are controlled by the levers 97 and 98 as shown in FIG. 2, these levers being pivotally connected intermediate their ends as indicated by reference characters 99 and 100 to the member 10 (FIG. 1). On their inner ends, the levers 97 and 98 carry pins or cam followers 101 and 102 which are adapted to be engaged by the interrupted cam flange 19 in response to rotation of the shaft 18. The outer ends of the levers 97 and 98 are interconnected by a tension spring 6. Also pivoted on the pivot 99 is a further lever 41 and a lever 40 is pivoted on the pin 100. The lever 40 is bifurcated at its inner end and straddles the eccentric portion 110 of the member 77. Its outer end is also bifurcated and is connected to mechanism not shown for controlling the dispensing of the cup and the necessary condiments. The lever 41 is provided with a roller 111 at its inner end which engages a notched portion of the inner end of lever 97 and is controlled thereby to actuate a sliding block member 25 (FIG. 4) which engages a cam lever 39 pivoted as at 112 to the bracket 113. The lever 39 when actuated engages the under side of the table 23 and lifts the same upwardly so that a container 28 as shown in FIG. 3 which is disposed beneath the spout 95 is forced into sealing engagement with the resilient annular seal device 114.

Any suitable ejector device may be utilized to eject the spent container after the table 23 has reached subsequent indexed position and subsequent to that the now empty table pocket passes beneath the container supply device for receiving a new container.

The mechanism is timed so that as the piston 50 injects fresh water into the heater 2, the lever 98 is activated by the cam flange 19 to positively close the valve 96. At the same time, the lever 97 is not constrained except through the medium of light pressure applied by the spring 6. As a consequence, the inherent resiliency of the valve 96, being of bellows-like form will allow the pressure of the freshly injected water to cause filling of the accumulator 7 through the passage 92, valve chamber 21 and inlet passage 90. At the same time, the table 23 is being moved to its next subsequent indexed position. This sequence is shown in operation with the component parts in relative positions as shown in FIG. 2. Thereafter, the cam mechanism continues to rotate in a clockwise direction ultimately to engage the flange 19 to actuate the lever 97 whereupon the valve 94 is positively closed and the valve 96 will retract to allow expulsion of the infusing water from the accumulator 7 through the outlet passage 91, valve chamber 21' and the nozzle 95.

Simultaneously with the action of the flange 19 against the follower of the lever 97, the lever 41 will also be pivoted to cause the member 25 to operate the cam 39 and lift the table 23 so that the sealing action on the container as above described will take place. Any suitable mechanism may be provided such as a one-revolution clutch or a microswitch arrangement which limits the rotation of shaft 18 to one revolution for each cycle.

Although certain specific embodiments of the invention have been shown and described, it is obvious that many modifications thereof are possible. The invention, therefore, is not to be restricted except insofar as is necessitated by the prior art and by the spirit of the appended claims.

I claim:

1. An automatic coffee making machine comprising, in combination, a reservoir for heated water, a discharge spout for heated water, means for dispensing a predetermined volume of heated water from said reservoir through said spout, a table for receiving a plurality of perforate containers having ground coffee therein, means mounting said table for sequential disposition of the containers beneath said spout, seal means surrounding said spout in opposed relation to said table and the containers carried thereby, and means for temporarily elevating said table to press a container against said seal means while hot water is being discharged through said spout.

2. The machine as defined in claim 1 wherein said means for dispensing hot water comprises an accumulator within said reservoir having an inlet passage communicating with said reservoir and an outlet passage communicating with said spout, positive displacement means for injecting a charge of fresh water under pressure into said reservoir, a valve in said inlet passage, a valve in said outlet passage, and means for sequentially actuating said valves first to open the inlet passage and close the outlet passage while said positive displacement means is operating, thereby to accumulate a charge of heated water in said accumulator, and then to close the inlet passage and open the outlet passage to allow the contents of said accumulator to be discharged through said spout.

3. The machine as defined in claim 2 including means for adjusting the pressure applied by said positive displacement means so as to vary the charge of heated water accepted by said accumulator.

4. The machine as defined in claim 3 wherein said means for adjusting the pressure applied by said positive displacement means comprises a pair of cavities connected to the outlet of the positive displacement means, one of said cavities also being connected to said reservoir, a first valve body in said one cavity and a second valve body in the other cavity, a plunger for operating each valve body, a lever engaging said plungers to oppose movement of the valve bodies and having resilient means normally urging said plungers in one direction against the pressure generated by said positive displacement means and seating said first valve body to interrupt communication between said one cavity and said reservoir, said second valve body presenting normally a greater area subjected to injected water pressure than does said first valve body so that said second valve body and its plunger control lever movement allowing unseating of said first valve body.

5. The machine as defined in claim 2 wherein said means for sequentially actuating said valves comprises a motor, cam means driven by said motor, and a pair of levers actuated by said cam means to control said valves.

6. The machine as defined in claim 5 wherein said positive displacement means is driven by said motor, said cam means also being connected to said table for indexing same.

7. The machine as defined in claim 5 wherein said means for temporarily elevating said table is also connected to said cam means.

8. The machine as defined in claim 7 wherein said means for temporarily elevating said table includes a cam lever beneath said table and a link for rocking said cam lever.

9. The machine as defined in claim 1 wherein each container includes a rim and said seal means engages said rim of that container beneath the spout when the table is elevated.

References Cited
UNITED STATES PATENTS

| | | | |
|---|---|---|---|
| 2,660,340 | 11/1953 | Thompson | 99—289 |
| 2,862,440 | 12/1958 | Oakes | 99—282 |
| 2,906,193 | 9/1959 | McCauley | 99—283 |
| 3,286,618 | 11/1966 | Barrera | 99—282 X |
| 3,345,933 | 10/1967 | Valente | 99—283 |

ROBERT W. JENKINS, *Primary Examiner.*

U.S. Cl. X.R.

99—302,289